（12） United States Patent
Ahn et al.

(10) Patent No.: US 8,681,475 B2
(45) Date of Patent: Mar. 25, 2014

(54) MOUNTING STRUCTURE OF CIRCUIT BOARD HAVING MULTI-LAYERED CERAMIC CAPACITOR THEREON

(75) Inventors: Young Ghyu Ahn, Gyeonggi-do (KR); Byoung Hwa Lee, Gyeonggi-do (KR); Min Cheol Park, Gyeonggi-do (KR); Sang Soo Park, Gyeonggi-do (KR); Dong Seok Park, Seoul (KR)

(73) Assignee: Samsung Electro-Mechancis Co., Ltd., Suwon Gyunggi-do (KR)

( * ) Notice: Subject to any disclaimer, the term of this patent is extended or adjusted under 35 U.S.C. 154(b) by 18 days.

(21) Appl. No.: 13/590,270

(22) Filed: Aug. 21, 2012

(65) Prior Publication Data

US 2013/0050894 A1     Feb. 28, 2013

(30) Foreign Application Priority Data

Aug. 22, 2011   (KR) ......................... 10-2011-0083482

(51) Int. Cl.
*H01G 4/06*   (2006.01)
(52) U.S. Cl.
USPC .................. 361/321.2; 361/321.1; 361/301.2; 361/306.1; 361/306.3; 361/303
(58) Field of Classification Search
USPC ................ 361/321.2, 303–305, 301.2, 301.4, 361/321.1, 306.1, 306.3
See application file for complete search history.

(56) References Cited

U.S. PATENT DOCUMENTS

| | | | |
|---|---|---|---|
| 6,381,117 B1 * | 4/2002 | Nakagawa et al. | 361/306.3 |
| 6,903,919 B2 * | 6/2005 | Kayatani et al. | 361/321.2 |
| 7,310,217 B2 * | 12/2007 | Takashima et al. | 361/306.3 |
| 7,719,819 B2 * | 5/2010 | Motoki et al. | 361/321.2 |
| 7,859,821 B2 * | 12/2010 | Shimizu | 361/306.3 |
| 8,125,765 B2 * | 2/2012 | Ishida et al. | 361/321.2 |
| 8,254,083 B2 * | 8/2012 | Sakurai et al. | 361/321.1 |
| 8,310,805 B2 * | 11/2012 | Tashima et al. | 361/303 |

FOREIGN PATENT DOCUMENTS

KR   1020040102326 A   12/2004

* cited by examiner

*Primary Examiner* — Nguyen T Ha
(74) *Attorney, Agent, or Firm* — McDermott Will & Emery LLP

(57) ABSTRACT

Disclosed herein is a mounting structure of a circuit board having a multi-layered ceramic capacitor thereon, the multi-layered ceramic capacitor including dielectric sheets laminated thereon and external terminal electrodes formed at both ends thereof, the dielectric sheets having internal electrodes formed thereon, and the external terminal electrodes being connected in parallel with the internal electrode, wherein the internal electrodes are disposed to be in parallel with the circuit board, the external terminal electrodes are bonded to lands of the circuit board by a conductive material, and a bonding height (Ts) of the conductive material is lower than a sum of a gap (Ta) between the circuit board and a bottom surface of the multi-layered ceramic capacitor and a thickness (Tc) of a cover layer on a lower portion of the multi-layered ceramic capacitor, whereby vibration noise can be greatly reduced.

9 Claims, 2 Drawing Sheets

MOUNTING STRUCTURE OF CIRCUIT BOARD HAVING MULTI-LAYERED CERAMIC CAPACITOR THEREON

CROSS REFERENCE(S) TO RELATED APPLICATIONS

This application claims the benefit under 35 U.S.C. Section 119 of Korean Patent Application Serial No. 10-2011-0083482, entitled "Mounting Structure of Circuit Board Having Multi-layered Ceramic Capacitor Thereon" filed on Aug. 22, 2011, which is hereby incorporated by reference in its entirety into this application.

BACKGROUND OF THE INVENTION

1. Technical Field

The present invention relates to a mounting structure of a circuit board having a multi-layered ceramic capacitor thereon, and more particularly, to a mounting structure of a circuit board having a multi-layered ceramic capacitor thereon, which makes a coating height of a solder lower than a height of a cover layer when horizontally mounting the multi-layered ceramic capacitor on the circuit board, thereby reducing vibration noise of the multi-layered ceramic capacitor.

2. Description of the Related Art

In general, a multi-layered ceramic capacitor (MLCC) is a chip type condenser that is mounted on a printed circuit board of diverse electronic products such as mobile communication terminals, laptop computers, computers, and personal mobile terminals (PDA) to perform a main function such as charging or discharging electricity, and adopts various sizes and layering patterns according to its purpose and capacitance.

Also, the multi-layered ceramic capacitor has a structure in which internal electrodes of a different polarity are alternately layered between a plurality of dielectric layers.

Such a multi-layered ceramic capacitor has been widely used as a part for diverse electronic devices because of its advantages of being miniaturized, while guaranteeing high capacitance, and being easily mounted.

As a ceramic material for forming a layered unit of the multi-layered ceramic capacitor, a ferroelectric material such as Barium Titanate with relatively high permittivity is generally used. However, since the ferroelectric material has piezoelectricity and electrostriction, stress and mechanical deformation appear as vibration when an electric field is applied to the ferroelectric material, and the vibration is transmitted to the board from a terminal electrode of the multi-layered ceramic capacitor.

That is, if an alternating current (AC) voltage is applied to the multi-layered ceramic capacitor, stresses (Fx, Ft, and Fz) are generated in directions of X, Y, and Z in an element body of the multi-layered ceramic capacitor, and vibration is generated due to the stresses. The vibration is transmitted to the board from the terminal electrode and thus the whole board becomes an acoustic radiation surface, generating vibrating sound as noise.

Most of the vibrating sound corresponds to vibrating sound of an auditory frequency (20~20000 Hz) and may have a compass unpleasant to people. Therefore, a solution to this problem is demanded.

Recently, in order to solve the problem caused by the vibrating sound, various techniques, such as a technique of preventing vibration by means of elastic deformation of an external terminal of the multi-layered ceramic capacitor, a technique of adopting a separate part to prevent noise by suppressing radio wave of vibration caused by piezoelectricity and electrostriction, and a technique of forming a board hole around the mounted multi-layered ceramic capacitor in order to suppress vibration of the board, have been suggested. However, these techniques require a separate process and do not obtain a remarkable vibration preventing effect for the complicated process.

The multi-layered ceramic capacitor may have substantially the same width and thickness. In the case of the multi-layered ceramic capacitor with substantially the same width and thickness, when the multi-layered ceramic capacitor is mounted on the printed circuit board, it is difficult to recognize directivities of internal conductors of the multi-layered ceramic capacitor by external appearances of the multi-layered ceramic capacitor. Therefore, the multi-layered ceramic capacitor is mounted on the printed circuit board regardless of the directivities of the internal conductors.

According to the directions of the internal conductors of the multi-layered ceramic capacitor mounted on the printed circuit board, there is a difference in the characteristics of the multi-layered ceramic capacitor, and in particular, there is a big difference in the vibration noise characteristic by the piezoelectricity of the multi-layered ceramic capacitor.

According to a recent experimental result, a mounting direction of the multi-layered ceramic capacitor correlates an amount of conductive material that connects an external terminal electrode of the multi-layered ceramic capacitor to a land, and the mounting direction of the multi-layered ceramic capacitor and the amount of conductive material greatly affects the vibration noise characteristic.

Particularly, since it is possible to noticeably reduce the vibration noise of the multi-layered ceramic capacitor by mounting the multi-layered ceramic capacitor with its internal electrode surface being in parallel to the surface of the printed circuit board and by adjusting a ratio between a bonding height of the conductive material to connect the external terminal electrode to the land and a bonding height of the external terminal electrode, there is a demand for a mounting structure to reduce vibration noise.

SUMMARY OF THE INVENTION

The present invention has been developed in order to overcome the disadvantages and problems that are raised in a related art mounting structure of a multi-layered ceramic capacitor, and an object of the present invention is to provide a mounting structure of a circuit board having a multi-layered ceramic capacitor thereon, which can reduce noise caused by vibration which occurs by a piezoelectric phenomenon when the multi-layered ceramic capacitor is horizontally mounted on the circuit board, by adjusting a coating height of a conductive material (solder) bonded to an external terminal electrode of the multi-layered ceramic capacitor.

According to an exemplary embodiment of the present invention, there is provided a mounting structure of a circuit board having a multi-layered ceramic capacitor thereon, the multi-layered ceramic capacitor including dielectric sheets laminated thereon and external terminal electrodes formed at both ends thereof, the dielectric sheets having internal electrodes formed thereon, and the external terminal electrodes being connected in parallel with the internal electrode, wherein the internal electrodes are disposed to be in parallel with the circuit board, the external terminal electrodes are bonded to lands of the circuit board by a conductive material, and a bonding height (Ts) of the conductive material is lower than a sum of a gap (Ta) between the circuit board and a bottom surface of the multi-layered ceramic capacitor and a thickness (Tc) of a cover layer on a lower portion of the multi-layered ceramic capacitor.

When the multi-layered ceramic capacitor is packaged by a packing material such as a reel, taping may be performed to align the multi-layered ceramic capacitor in one direction so that the internal electrodes of the multi-layered ceramic capacitor are mounted on the circuit board in a horizontal direction. The multi-layered ceramic capacitor may have the same or similar width (W) and thickness (T).

The same width and thickness of the multi-layered ceramic capacitor may mean that the width and the thickness are the same in terms of the social concept rather than the physical concept. The similar width and thickness of the multi-layered ceramic capacitor may fall within a range of $0.75 \leq T/W \leq 1.25$. That is, the multi-layered ceramic capacitor may be formed in a rectangular parallelepiped shape with the external terminal electrodes formed at both ends of the multi-layered ceramic capacitor.

As the number of dielectric sheets between the internal electrodes of the multi-layered ceramic capacitor becomes greater or an electric field applied to the dielectric sheets becomes greater, stress and mechanical deformation caused by piezoelectricity of the multi-layered ceramic capacitor become more serious. In particular, vibration noise becomes significant, if the number of dielectric layers is 200 or more and thickness of the dielectric layers is 3 µm or less.

Accordingly, the number of dielectric layers of the multi-layered ceramic capacitor may be 200 or more and a thickness of the dielectric layers of the multi-layered ceramic capacitor may be 3 µm or less. Here, the number of dielectric layers of the multi-layered ceramic capacitor may be 200 or more, and simultaneously a thickness thereof may be 3 µm or less.

DESCRIPTION OF THE PREFERRED EMBODIMENTS

Hereinafter, exemplary embodiments will be described in detail with reference to the accompanying drawings so that they can be easily practiced by those skilled in the art to which the present invention pertains.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Figure 1:
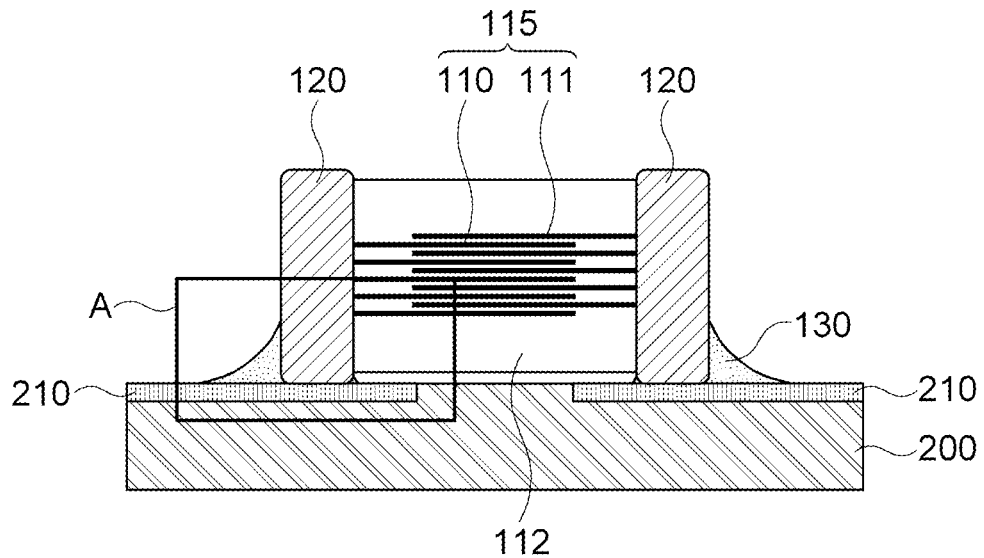
FIG. 1 is a cross sectional view of a multi-layered ceramic capacitor mounted on a circuit board according to the present invention.
Figure 2:
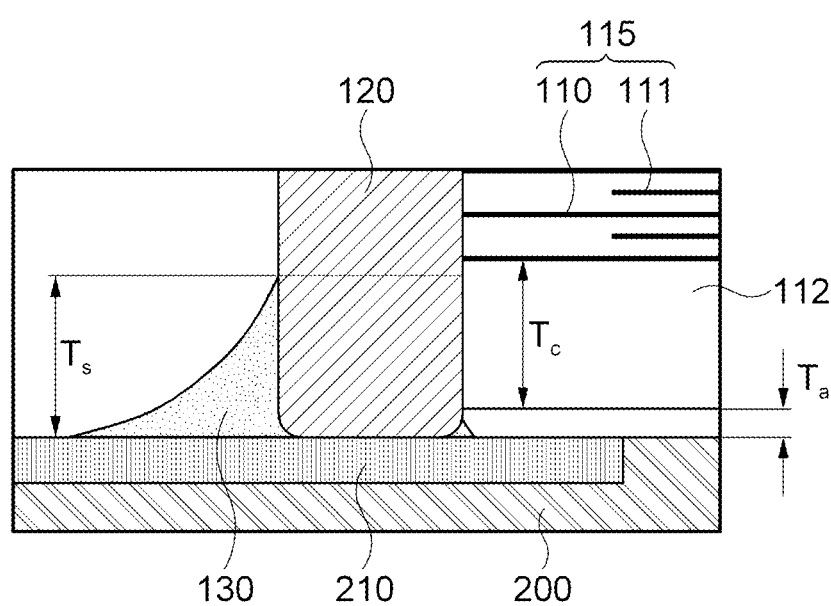
FIG. 2 is an enlarged view of portion "A" of FIG. 1.

FIG. 1 is a cross sectional view of a multi-layered ceramic capacitor mounted on a circuit board according to the present invention, and FIG. 2 is an enlarged view of portion 'A' of FIG. 1.

As shown in the drawings, a mounting structure of a circuit board having a multi-layered ceramic capacitor thereon includes a multi-layered ceramic capacitor 100. In the multi-layered ceramic capacitor 100, a plurality of dielectric sheets 110 on which internal electrodes 111 are formed are laminated, and external terminal electrodes 120 connected in parallel with the internal electrodes 111 are formed at both ends of the multi-layered ceramic capacitor 100.

In order to mount the multi-layered ceramic capacitor 100 configured as described above on a circuit board, lands 210 are formed on a surface of the circuit board 200 to mount the multi-layered ceramic capacitor 100 thereon, the multi-layered ceramic capacitor 100 is placed such that the internal electrodes 111 are in parallel to the circuit board 200, and then the multi-layered ceramic capacitor 100 is electrically connected and fixed to the circuit board 200 by conductively bonding the external terminal electrodes 120 and the lands 210 using a conductive material 130.

Herein, as shown in FIG. 2, a gap between a top surface of the circuit board 200 and a bottom surface of the multi-layered ceramic capacitor 100 is defined as 'Ta', and a thickness of a cover layer 112 which is laminated on an upper portion and a lower portion of the dielectric sheets 110 on which the internal electrodes 111 of the multi-layered ceramic capacitor 100 are formed is defined as 'Tc'. Also, a bonding height of the conductive material 130 which is coated over an outside of the external terminal electrode 120 mounted on the land 210 of the circuit board 200 in an underfill pattern is defined as 'Ts'.

The cover layer 112 refers to a portion that is formed by multi-layering dielectric sheets without an internal electrode on the upper and the lower portions of the dielectric sheets 110 on which the internal electrodes 111 are formed, when the multi-layered ceramic capacitor is manufactured.

Also, when the external terminal electrodes 120 formed at both ends of the multi-layered ceramic capacitor 100 are seated on the lands 210 of the circuit board 200 and are bonded by the conductive material 130, the bonding height (Ts) of the conductive material is adjusted to be lower than a sum of the gap (Ta) between the top surface of the circuit board and the bottom surface of the multi-layered ceramic capacitor and the thickness (Tc) of the cover layer laminated on the upper and the lower portions of the dielectric sheets on which the internal electrodes of the multi-layered ceramic capacitor are formed, so that vibration occurring in the multi-layered ceramic capacitor can be prevented from being transmitted to the board and thus noise can be reduced.

Hereinbelow, the structure of the multi-layered ceramic capacitor and the mounting structure of the multi-layered ceramic capacitor on the circuit board employed in the present invention will be explained in more detail with reference to FIGS. 1 and 2.

As shown in FIG. 1, the multi-layered ceramic capacitor 100 includes an element 115 in which the dielectric layers 110 and the internal electrodes 111 are alternately laminated, and a pair of external electrodes 120 which are alternately connected to the internal electrodes in parallel at both ends of the element 115.

The cover layer 112 consisting of dielectric layers without an internal electrode thereon may be further formed on upper and lower portions of the element 115 in which the internal electrodes 111 are alternately laminated.

The dielectric layers 110 are made of a ferroelectric material containing Barium Titanate as a main component, and include all ferroelectric materials besides the Barium Titanate.

The internal electrodes 111 are made of a metal thin film in which a metal paste is sintered, and the metal paste uses a metal material such as Ni, Pd, Ag—Pd, and Cu as a main component.

The external electrode 120 is made of a metal material such as Cu and Ni, and a surface of the external electrode 120 is processed by solder plating in order to improve solder wettability.

The lands 210 are formed on the surface of the circuit board 200 to mount the multi-layered ceramic capacitor 100 thereon. The lands 210 refer to portions to mount the multi-layered ceramic capacitor thereon by coating the conductive material 130 over a top surface of solder resist exposed from the inside of the circuit board 200 and bonding the multi-layered ceramic capacitor 100. The circuit board 200 may be a multi-layered circuit board or a single layer-double sided printed circuit board, but is not limited to a specific type.

Figure 3A:
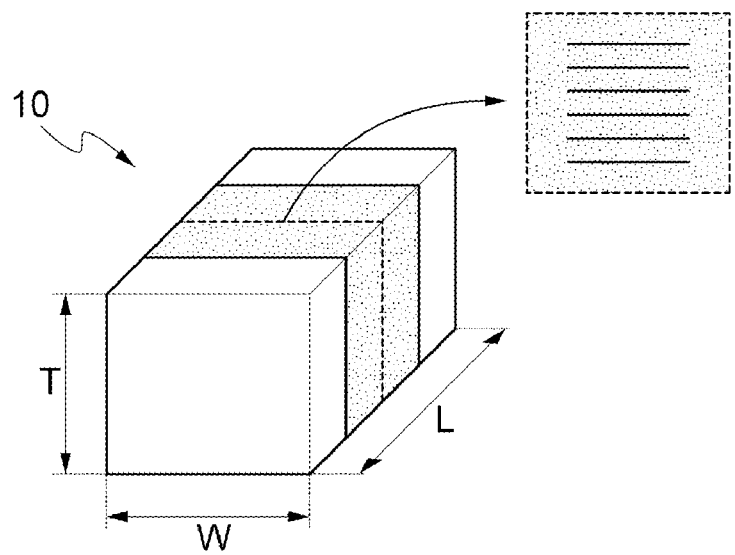
FIG. 3 is a perspective view illustrating a multi-layered ceramic capacitor (a) having the same or similar width and thickness and a multi-layered ceramic capacitor (b) having a width larger than a thickness.
Figure 3B:
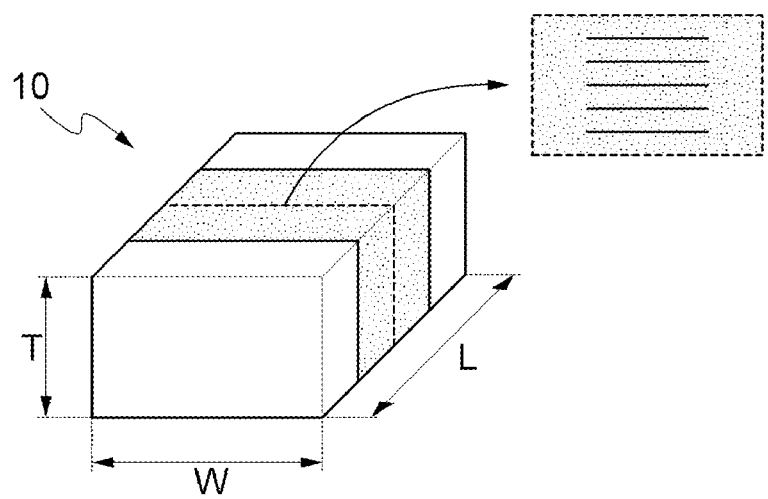

As shown in FIG. 3, the multi-layered ceramic capacitor 100 may be manufactured to have the same or similar width (W) and thickness (T) (see (a) of FIG. 3) and to have a width larger than a thickness (see (b) FIG. 3). In the case of the latter multi-layered ceramic capacitor, the width and the thickness can be automatically discriminated from each other with the naked eye because the thickness is smaller than the width, so that the multi-layered ceramic capacitor can be horizontally mounted. However, in the case of the former multi-layered ceramic capacitor, it is difficult to discriminate the width and the thickness with only the naked eye, so that horizontal mounting and vertical mounting are randomly performed. In particular, when the multi-layered ceramic capacitor is packed by a packing material such as a reel, taping is performed to align the multi-layered ceramic capacitor in one direction so that the internal electrodes of the multi-layered ceramic capacitor are mounted on the circuit board in a horizontal direction. In the case of the multi-layered ceramic capacitor having the same or similar width and thickness, noise caused by vibration can be reduced more efficiently by the horizontal mounting. The same or similar width and thickness of the multi-layered ceramic capacitor may fall within a range of $0.75 \leq T/W \leq 1.25$.

The conductive material 130 is a bonding means for fixing the multi-layered ceramic capacitor 100 and the circuit board 200 and also performs a role as a medium of vibration between the multi-layered ceramic capacitor 100 and the circuit board 200. As the bonding height and the bonding area of the conductive material 130 become smaller, the role as the medium of vibration becomes smaller and transmission of vibration to the board is attenuated.

In particular, if the multi-layered ceramic capacitor is horizontally mounted, transmission of vibration on a top surface of the conductive material 130 among vibrations on edge portions by piezoelectricity of the multi-layered ceramic capacitor 100 is greatly attenuated with the decreased bonding height of the conductive material 130. Therefore, vibration noise is very greatly reduced according to the bonding height of the conductive material 130, if the multi-layered ceramic capacitor is horizontally mounted.

On the other hand, if the multi-layered ceramic capacitor is vertically mounted, the above effect does not occur and thus the vibration noise is not greatly reduced according to the bonding area of the conductive material 130.

Accordingly, in order to reduce the noise caused by the multi-layered ceramic capacitor, the multi-layered ceramic capacitor 100 is mounted in a direction parallel to the circuit board 200 with reference to the internal electrodes 111, and it is to preferable to reduce transmission of the vibration by reducing the bonding height of the conductive material 130 to the area of the external terminal electrode 120.

According to the width (W) and a length (L) of the multi-layered ceramic capacitor of FIG. 3, the multi-layered ceramic capacitor has a size of 0603 (L×W=0.6 mm×0.3 mm), 1005, 1608, 2012, 3216, and 3225. In the case of the multi-layered ceramic capacitor of 3216 or larger, even if the bonding height of the conductive material 130 bonded to the side surface of the external terminal electrode 120 of the multi-layered ceramic capacitor is slightly low, the bonding area of the conductive material 130 coated over the land 210 is sufficient and thus the fixing state of the circuit board 200 and the multi-layered ceramic capacitor 100 can be maintained sufficiently.

In order to increase the vibration noise reduction effect of the multi-layered ceramic capacitor 100, it is preferable that the bonding height (Ts) of the conductive material 130 is adjusted to be lower than the sum of the gap (Ta) between the top surface of the circuit board 200 and the bottom surface of the multi-layered ceramic capacitor 100 and the thickness (Tc) of the cover layer 112 laminated on the upper and the lower portions of the dielectric sheets 110 on which the internal electrodes of the multi-layered ceramic capacitor 100 are formed (Ts<Ta+Tc).

In the related field, the multi-layered ceramic capacitor is generally mounted on the circuit board 200 to be able to limit vibration noise less than 30 dB, and, recently, limits vibration noise up to 25 dB according to a current trend toward slimness and miniaturization of electronic products.

As set forth in table 1 below, the vibration noise of the multi-layered ceramic capacitor can be managed to less than 25 dB, if the bonding height (Ts) of the conductive material 130 coated over a portion where the external terminal electrode 120 of the multi-layered ceramic capacitor 100 and the land 210 of the circuit board 200 are connected to each other is less than the sum of the gap (Ta) between the top surface of the circuit board and the bottom surface of the multi-layered ceramic capacitor and the thickness (Tc) of the cover layer laminated on the upper and the lower portions of the dielectric sheets on which the internal electrodes of the multi-layered ceramic capacitor are formed (Ta+Tc):

TABLE 1

| $t_a$ | $t_c$ | $t_a + t_c$ | $t_s$ | Vibrating Sound |
|---|---|---|---|---|
| 52 um | 43 um | 95 um | 212 um | 29.2 dB |
|  |  |  | 120 um | 28.7 dB |
|  |  |  | 90 um | 24.3 dB |
|  |  |  | 75 um | 23.9 dB |
| 61 um | 66 um | 127 um | 254 um | 28.8 dB |
|  |  |  | 133 um | 28.5 dB |
|  |  |  | 119 um | 23.2 dB |
|  |  |  | 82 um | 22.4 dB |
| 56 um | 94 um | 150 um | 242 um | 28.9 dB |
|  |  |  | 179 um | 27.4 dB |
|  |  |  | 128 um | 23.8 dB |
|  |  |  | 84 um | 23.1 dB |

As described above, it can be seen that the vibration noise is reduced as the bonding height of the conductive material to bond the multi-layered ceramic capacitor and the land is reduced. However, if the bonding height (Ts) of the conductive material 130 on the side surface of the external terminal electrode 120 is lower than or equal to the gap (Ta) between the top surface of the circuit board 200 and the bottom surface of the multi-layered ceramic capacitor 100, bonding force between the external terminal electrode of the multi-layered ceramic capacitor and the land of the circuit board may be noticeably reduced and bonding reliability may deteriorate.

Accordingly, it is preferable that the bonding height (Ts) of the conductive material is higher than the gap (Ta) between the top surface of the circuit board and the bottom surface of the multi-layered ceramic capacitor (Ts>Ta).

The conductive material 130 is a material that conducts electricity to electrically connect the circuit board 200 and the multi-layered ceramic capacitor and is not limited to a specific material, but it is preferable to use a solder.

As described above, when the multi-layered ceramic capacitor is bonded to the circuit board using the conductive material, the bonding height (Ts) of the conductive material to bond the external terminal electrodes of the multi-layered ceramic capacitor and the land pattern of the circuit board is adjusted to be lower than the sum of the gap (Ta) between the top surface of the circuit board and the bottom surface of the multi-layered ceramic capacitor and the thickness (Tc) of the cover layer laminated on the upper and the lower portions of the dielectric sheets on which the internal electrodes of the multi-layered ceramic capacitor are formed, so that the transmission of the vibration occurring on the multi-layered ceramic capacitor is suppressed and thus the noise can be greatly reduced.

While the present invention has been shown and described in connection with the embodiments, it will be apparent to those skilled in the art that modifications and variations can be made without departing from the spirit and scope of the invention as defined by the appended claims.

What is claimed is:

1. A mounting structure of a circuit board having a multi-layered ceramic capacitor thereon, the multi-layered ceramic capacitor including dielectric sheets laminated thereon and external terminal electrodes formed at both ends thereof, the dielectric sheets having internal electrodes formed thereon, and the external terminal electrodes being connected in parallel with the internal electrode,
wherein the internal electrodes are disposed to be in parallel with the circuit board, the external terminal electrodes are bonded to lands of the circuit board by a conductive material, and a bonding height (Ts) of the conductive material is lower than a sum of a gap (Ta) between the circuit board and a bottom surface of the multi-layered ceramic capacitor and a thickness (Tc) of a cover layer on a lower portion of the multi-layered ceramic capacitor (Ts<Ta+Tc).

2. The mounting structure according to claim 1, wherein the multi-layered ceramic capacitor is taped to be mounted horizontally and has the same or similar width (W) and thickness (T).

3. The mounting structure according to claim 2, wherein the number of dielectric layers of the multi-layered ceramic capacitor is 200 or more.

4. The mounting structure according to claim 2, wherein a thickness of dielectric layers of the multi-layered ceramic capacitor is 3 μm or less.

5. The mounting structure according to claim 2, wherein the number of dielectric layers of the multi-layered ceramic capacitor is 200 or more, and a thickness thereof is 3 μm or less.

6. The mounting structure according to claim 1, wherein the number of dielectric layers of the multi-layered ceramic capacitor is 200 or more.

7. The mounting structure according to claim 1, wherein a thickness of dielectric layers of the multi-layered ceramic capacitor is 3 μm or less.

8. The mounting structure according to claim 1, wherein the number of dielectric layers of the multi-layered ceramic capacitor is 200 or more, and a thickness thereof is 3 μm or less.

9. The mounting structure according to claim 1, wherein the bonding height (Ts) of the conductive material is higher than the gap (Ta) between a top surface of the circuit board and the bottom surface of the multi-layered ceramic capacitor (Ts>Ta).

* * * * *